(12) United States Patent
Zappi et al.

(10) Patent No.: US 9,045,839 B2
(45) Date of Patent: Jun. 2, 2015

(54) METHODS AND SYSTEMS FOR IN-SITU ELECTROPLATING OF ELECTRODES

(75) Inventors: Guillermo Daniel Zappi, Nisakayuna, NY (US); Kenneth Paul Zarnoch, Scotia, NY (US); Christian Andrew Huntley, Charlton, NY (US); Dana Ray Swalla, Schenectady, NY (US)

(73) Assignee: General Electric Company, Schenectady, NY (US)

(*) Notice: Subject to any disclaimer, the term of this patent is extended or adjusted under 35 U.S.C. 154(b) by 1795 days.

(21) Appl. No.: 12/136,331

(22) Filed: Jun. 10, 2008

(65) Prior Publication Data
US 2009/0301871 A1     Dec. 10, 2009

(51) Int. Cl.
| | |
|---|---|
| C25D 17/00 | (2006.01) |
| C25D 13/00 | (2006.01) |
| C25D 11/00 | (2006.01) |
| C25D 5/48 | (2006.01) |
| C25B 1/10 | (2006.01) |
| C25B 9/20 | (2006.01) |
| C25B 11/00 | (2006.01) |
| C25B 15/00 | (2006.01) |
| C25D 5/08 | (2006.01) |
| C25D 3/56 | (2006.01) |

(52) U.S. Cl.
CPC ... C25D 5/48 (2013.01); C25B 1/10 (2013.01); C25B 9/206 (2013.01); C25B 11/00 (2013.01); C25B 15/00 (2013.01); C25D 3/562 (2013.01); C25D 17/00 (2013.01); Y02E 60/366 (2013.01); C25D 17/002 (2013.01); C25D 5/08 (2013.01)

(58) Field of Classification Search
CPC .............................. C25D 7/065; C25D 17/002
USPC ................... 204/283; 205/118, 150, 148, 223
See application file for complete search history.

(56) References Cited

U.S. PATENT DOCUMENTS

| | | | |
|---|---|---|---|
| 4,090,939 A | 5/1978 | Nicolas et al. | |
| 4,104,133 A | * 8/1978 | Brannan et al. | ............... 205/122 |
| 4,135,996 A | 1/1979 | Bouy et al. | |
| 4,144,161 A | 3/1979 | Bourgeois | |

(Continued)

OTHER PUBLICATIONS

Electronic Development Labs, Inc., EDL Tool & Die, Typical Linear coefficient of expansion for common Plastics, http://www.edl-inc.com/Plastic%20expansion%20rates.htm, printed Aug. 1, 2008.

(Continued)

*Primary Examiner* — Nicholas A Smith
*Assistant Examiner* — Brian W Cohen
(74) *Attorney, Agent, or Firm* — Fletcher Yoder, P.C.

(57) ABSTRACT

The present techniques provide electrochemical devices having enhanced electrodes with surfaces that facilitate operation, such as by formation of a porous nickel layer on an operative surface, particularly of the cathode. The porous metal layer increases the surface area of the electrode, which may result in increasing the efficiency of the electrochemical devices. The formation of the porous metal layer is performed in situ, that is, after the assembly of the electrodes into an electrochemical device. The in situ process offers a number of advantages, including the ability to protect the porous metal layer on the electrode surface from damage during assembly of the electrochemical device. The enhanced electrode and the method for its processing may be used in any number of electrochemical devices, and is particularly well suited for electrodes in an electrolyzer useful for splitting water into hydrogen and oxygen.

24 Claims, 7 Drawing Sheets

(56) References Cited

U.S. PATENT DOCUMENTS

| | | | |
|---|---|---|---|
| 4,160,704 A * | 7/1979 | Kuo et al. | 205/211 |
| 4,243,497 A | 1/1981 | Nicolas et al. | |
| 4,547,411 A | 10/1985 | Bachot et al. | |
| 4,695,489 A | 9/1987 | Zarnoch et al. | |
| 5,227,030 A * | 7/1993 | Beaver et al. | 205/532 |
| 5,500,583 A | 3/1996 | Buckley et al. | |
| 6,485,627 B1 * | 11/2002 | Johal et al. | 205/148 |
| 6,632,347 B1 | 10/2003 | Buckley et al. | |
| 6,652,731 B2 | 11/2003 | Cobley et al. | |
| 6,736,954 B2 | 5/2004 | Cobley et al. | |
| 6,773,573 B2 | 8/2004 | Gabe et al. | |
| 6,911,068 B2 | 6/2005 | Cobley et al. | |
| 7,188,478 B2 | 3/2007 | Bourgeois | |
| 7,303,660 B2 | 12/2007 | Buckley et al. | |
| 7,381,313 B2 | 6/2008 | Libby et al. | |
| 2006/0053792 A1 | 3/2006 | Bourgeois | |
| 2006/0228619 A1 | 10/2006 | Bowen et al. | |
| 2007/0000789 A1 | 1/2007 | Libby et al. | |
| 2007/0122339 A1 | 5/2007 | Kulkarni et al. | |
| 2007/0278108 A1 | 12/2007 | Rosenzweig et al. | |
| 2008/0083614 A1 | 4/2008 | Swalla et al. | |
| 2008/0145746 A1 | 6/2008 | Zappi et al. | |
| 2008/0145749 A1 | 6/2008 | Lacovangelo et al. | |
| 2008/0145755 A1 | 6/2008 | Lacovangelo et al. | |

OTHER PUBLICATIONS

Handy Harman Canada, Comparisons of Materials: Coefficient of Thermal Expansion, http://www.handyharmancanada.com/TheBrazingBook/comparis.htm, printed Oct. 9, 2008.

Wikipedia, The Free Encylopedia, Thermal Expansion, http://en.wikipedia.org/wiki/Thermal_expansion, printed Aug. 1, 2008.

* cited by examiner

METHODS AND SYSTEMS FOR IN-SITU ELECTROPLATING OF ELECTRODES

STATEMENT REGARDING FEDERALLY SPONSORED RESEARCH & DEVELOPMENT

This invention was made with Government support under contract number DE-FC07-06ID14789 awarded by the Department of Energy. The Government has certain rights in the invention.

BACKGROUND

The present techniques generally relate to methods of electroplating electrodes, and in particular to a method for in situ electroplating of electrodes in electrochemical devices such as electrolyzers.

Electrochemical devices are useful in chemical reactions in which electrons may participate as reactants or products. For example, an electrolytic cell may use electrical energy to split lower energy reactants into higher energy products, which may then be used as materials, reactants, or in power generation. In another example, voltaic cells and fuel cells may be used to chemically combine higher energy products to form lower energy products, releasing electrons that may be used to power other devices. While in voltaic cells, the electrode may be consumed during the reaction, in a number of other electrochemical devices, such as electrolytic cells and fuel cells, the electrode is not intended to be a reactant, but merely to catalyze the reaction, and collect or donate the current from the reaction.

Electrolytic cells may be useful in a number of processes, such as the splitting of water into oxygen and hydrogen in an electrolyzer. The hydrogen generated may be used in chemical processes, such as hydroformulation or hydrocracking in refineries, or may be stored for later use, such as in the generation of energy in a fuel cell. Further, in the reverse of electrolysis, fuel cells may be used for combining hydrogen and oxygen to form water, releasing electrical energy. In either fuel cells or electrolytic cells, among many other electrochemical devices, such as sensors, the surface materials and textures of the electrodes used may determine the efficiency and operating characteristics of the electrochemical devices.

A common electrode material used in electrochemical devices is platinum, due to its catalytic activity and stability. However, platinum may be more costly than desirable, especially in electrical devices that are intended for widespread use. Accordingly, there continues to be a need for new types of electrode materials and systems for electrodes in electrochemical devices.

BRIEF DESCRIPTION OF THE INVENTION

An embodiment of the present techniques provides a method for in situ processing of electrodes. The method includes assembling a plurality of cells, wherein each cell has a metal plate and a diaphragm. The cells are joined together to form a device comprising a stack of cells, wherein the metal plate of each cell is separated from the metal plate of an adjoining cell by the diaphragm of the respective cell. The metal plate of each cell is plated in situ by flowing a plating solution through each cell and applying an electrical field across the stack to form a metal layer over the metal plate of each cell. Finally, the surface area of the metal layer is increased in situ.

Another embodiment provides a method for making an electrolyzer including assembling a plurality of cells plate assemblies comprising metal plates interposed with a plurality of diaphragm assemblies in an electrolyzer body. The plate assemblies and the diaphragm assemblies include flow paths for the flow of fluid over the plate assemblies and diaphragm assemblies. Plating the metal plates in situ with a metal layer that includes at least two metals by flowing a plating solution through the flow paths. One of the metals is partially removed in situ from the metal layer to increase the surface area of the metal layer.

Another embodiment provides an electrolyzer that includes a plurality of cells in a stacked arrangement. Each cell in the electrolyzer includes a metal plate having two opposed surfaces configured to operate as a cathodic surface and an anodic surface and a porous layer being formed in situ over at least one of the surfaces of the metal plate. Each cell further includes a diaphragm separating the metal plate from the metal plate of an adjacent cell. A cathodic flow path allows reactants to contact the cathodic surface of each metal plate, and a anodic flow path allows reactants to contact the anodic surface of each metal plate.

DESCRIPTION OF THE DRAWINGS

These and other features, aspects, and advantages of the present invention will become better understood when the following detailed description is read with reference to the accompanying drawings in which like characters represent like parts throughout the drawing.

DETAILED DESCRIPTION

As discussed in detail below, embodiments of the present techniques provide electrochemical devices having enhanced electrodes with surfaces that facilitate operation, such as by formation of a porous nickel layer on an operative surface, particularly of the cathode. The porous metal layer increases the surface area of the electrode, which may result in increasing the efficiency of the electrochemical devices. The formation of the porous metal layer may be performed in situ, that is, after the assembly of the electrodes into an electrochemical device. The in situ process offers a number of advantages, including the ability to protect the porous metal layer on the electrode surface from damage during assembly of the electrochemical device. The enhanced electrode and the method for its processing may be used in any number of electrochemical devices, and is particularly well suited for electrodes in an electrolyzer useful for splitting water into hydrogen and oxygen.

Figure 1:
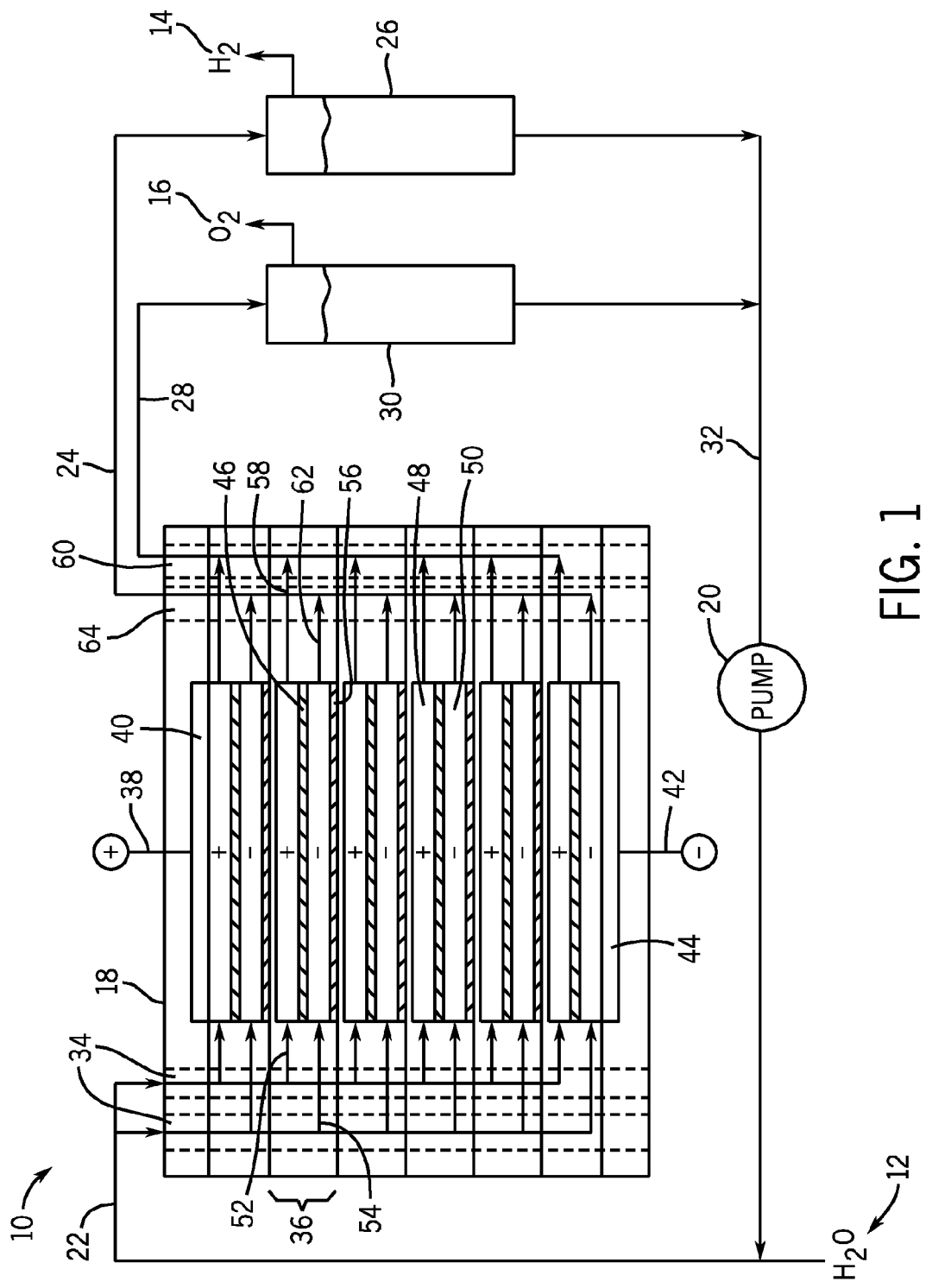
FIG. 1 is a diagrammatical representation of an electrolyzer that may use an enhanced electrode processed according to an embodiment of present techniques.

An example of a device that may use the enhanced electrodes of the present techniques is illustrated by the schematic diagram of FIG. 1, which is a flow diagram of an electrolyzer system 10. In the electrolyzer system 10, water 12 is split into hydrogen 14 and oxygen 16 by an electrolyzer stack 18. In operation, a pump 20 maintains a continuous flow of an electrolyte solution 22 through the electrolyzer stack 18. Generally, the electrolyte solution 22 may be an aqueous solution of about 20 wt % to about 40 wt. %, or about 30 wt %, potassium hydroxide (KOH) or sodium hydroxide (NaOH), although any number of other ionic solutions may be used. For example, the electrolyte solution may contain lithium hydroxide or other metals.

As a portion of the water 12 is converted to hydrogen 14 and oxygen 16, additional water 12 may be added prior to returning the electrolyte solution 22 to the electrolyzer stack 18. As discussed in further detail below, the electrolyzer stack 18 produces a hydrogen stream 24 containing bubbles of hydrogen 14 in the electrolyte solution 22. The hydrogen stream 24 is directed to a hydrogen separator 26, where the hydrogen 14 separates out and is collected for storage or use. The electrolyzer stack 18 also produces a separate oxygen stream 28 containing bubbles of oxygen 16 in the electrolyte solution 22, which is directed to an oxygen separator 30. In the oxygen separator 30, the oxygen 16 is separated from the electrolyte solution 22. The hydrogen separator 26 and oxygen separator 30 may generally function as reservoirs for the electrolyte solution 22. From the separators 26, 30 a return electrolyte solution 32 may be directed to the pump 20, where it is circulated to the electrolyzer stack 18.

In the electrolyzer stack 18, two inlet channels 34 direct the electrolyte solution 22 to a number of individual electrolyzer cells 36. The inlet channels 34 may be formed by adjoining apertures formed in each of the electrolyzer cells 36, which are stacked and electrically connected in series, such as by the conductivity of the electrolyte solution 22. In the illustrated embodiment, the electrolyzer stack 18 contains 10 electrolyzer cells 36, although any number may be included, such as 50, 75, 100, or more electrolyzer cells 36 depending on the current available and the production rates desired. At one end of the electrolyzer stack 18, a positive source 38 may be connected to a positive current collector 40. At the other end of the stack, a negative source 42 may be connected to a negative current collector 44. A metal plate 46 disposed within each of the electrolyzer cells 36 functions as a bipolar electrode. As current is passed through the electrolyte solution 22, a positive charge is induced on the side of the metal plate 46 closest to the positive electrode 38, forming an anodic surface or anode 48. Similarly, a negative charge is induced on the side of the metal plate 46 closest to the negative electrode, forming a cathodic surface or cathode 50. The metal plate 46 may have a wire mesh or other surface-increasing structures affixed to the surfaces (such as by welding) to increase the surface area. Further, according to presently contemplated embodiments of the present techniques, the metal plate 46 may have a porous metal layer formed on or disposed over the surface to increase the surface area and, thus, the efficiency of the electrolysis, as discussed below.

Generally, during electrolysis, the difference in charge between the anode 48 and cathode 50 may be on the order of about 1.5 volts to about 2.2 volts. Accordingly, as the electrolyzer cells 36 are in series, the voltage and/or current supplied to the electrolyzer stack 18 will be increased to accommodate the number of electrolyzer cells 36 in the stack. For example, the voltage supplied to the electrolyzer stack 18 may range from about 15 to about 22 volts, for embodiments with 10 electrolyzer cells 36 and range from about 150 volts to about 220 volts, for embodiments with 100 electrolyzer cells 36. Other voltages, and indeed, other charge application schemes may also be envisaged.

During operation of the electrolyzer stack 18, the electrolyzer solution 22 is passed over the anode 48 of the metal plate 46, through a channel 52 formed in each of the electrolyzer cells 36 and connected to one of the inlet channels 34. A second channel 54 directs electrolyte solution 22 over the cathode 50 of the metal plate 46. The water 12 in the electrolyte solution 22 is split into oxygen 16 at the anode 48 and hydrogen 14 at the cathode 50. The bubbles of hydrogen 14 and oxygen 16 are isolated from each other by a liquid permeable membrane 56, which allows water and ions from the electrolyte solution 18 to flow conducting current, between the anode 48 and the cathode 50, but generally prevents the transfer of gas. The liquid permeable membrane 56 may be made from any number of hydrophilic polymers, including, for example, polysulfones, polyacrylamides, and polyacrylic acids, among others.

The oxygen stream 28 formed at the anode 48 of each of the electrolyzer cells 36, is directed through an oxygen channel 58 to an oxygen outlet channel 60. From the oxygen outlet channel 60, the oxygen stream 28 is directed to the oxygen separator 30. Similarly, the hydrogen stream 24 formed at the cathode 50 of each of the electrolyzer cells 36 is directed through a hydrogen channel 62 to a hydrogen outlet channel 64. From the hydrogen outlet channel 64, the hydrogen stream 24 is directed to the hydrogen separator 26. As for the inlet channels 34, the outlet channels 60, 64 may be formed by adjacently aligned apertures formed through each of the individual electrolyzer cells 36.

Figure 2:
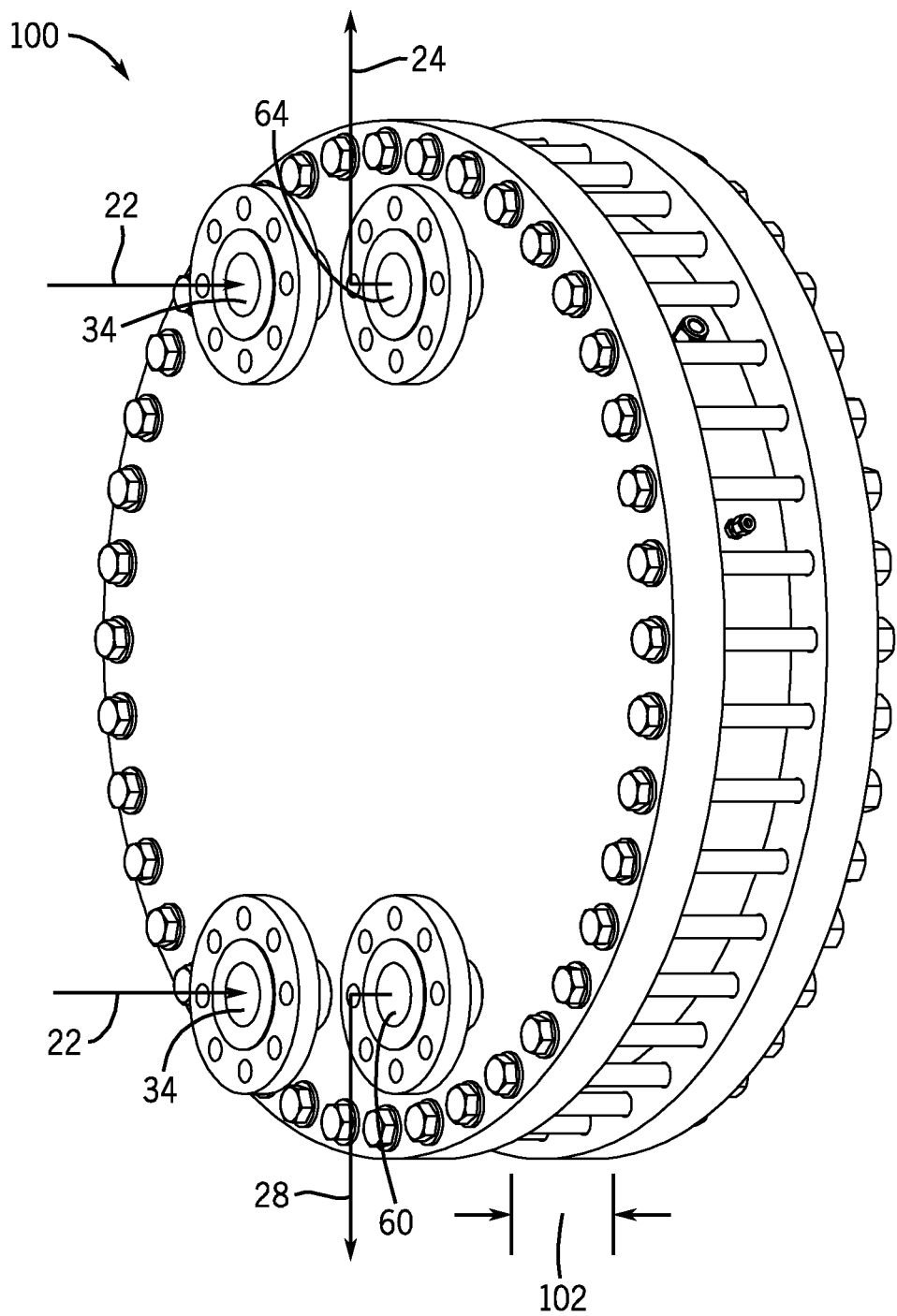
FIG. 2 is a perspective view of an exemplary assembled electrolyzer incorporating such electrodes.

The electrolyzer stack 18 may be mounted in an enclosure as illustrated in FIG. 2, forming an electrolyzer 100. The electrolyzer 100 has connections for the inlet channels 34 to allow the flow of electrolyte solution 22 into the electrolyzer 100. The electrolyzer 100 also has connections for the oxygen outlet channel 60 to allow the oxygen stream 28 to be removed, and the hydrogen outlet channel 64 to allow the hydrogen stream 24 to be removed. In the illustrated embodiment, the structure forms a pressure vessel, and the connections are flanged connections for interfacing with mating piping. Other physical configurations may, of course, be envisaged. Generally, in a presently contemplated embodiment, the thickness 102 of the electrolyzer 100 may be about 150 cm, but the actual size and dimensions will vary depending upon the number of electrolyzer cells used. The details of the electrolyzer 100 may be seen more clearly in FIG. 3.

Figure 3:
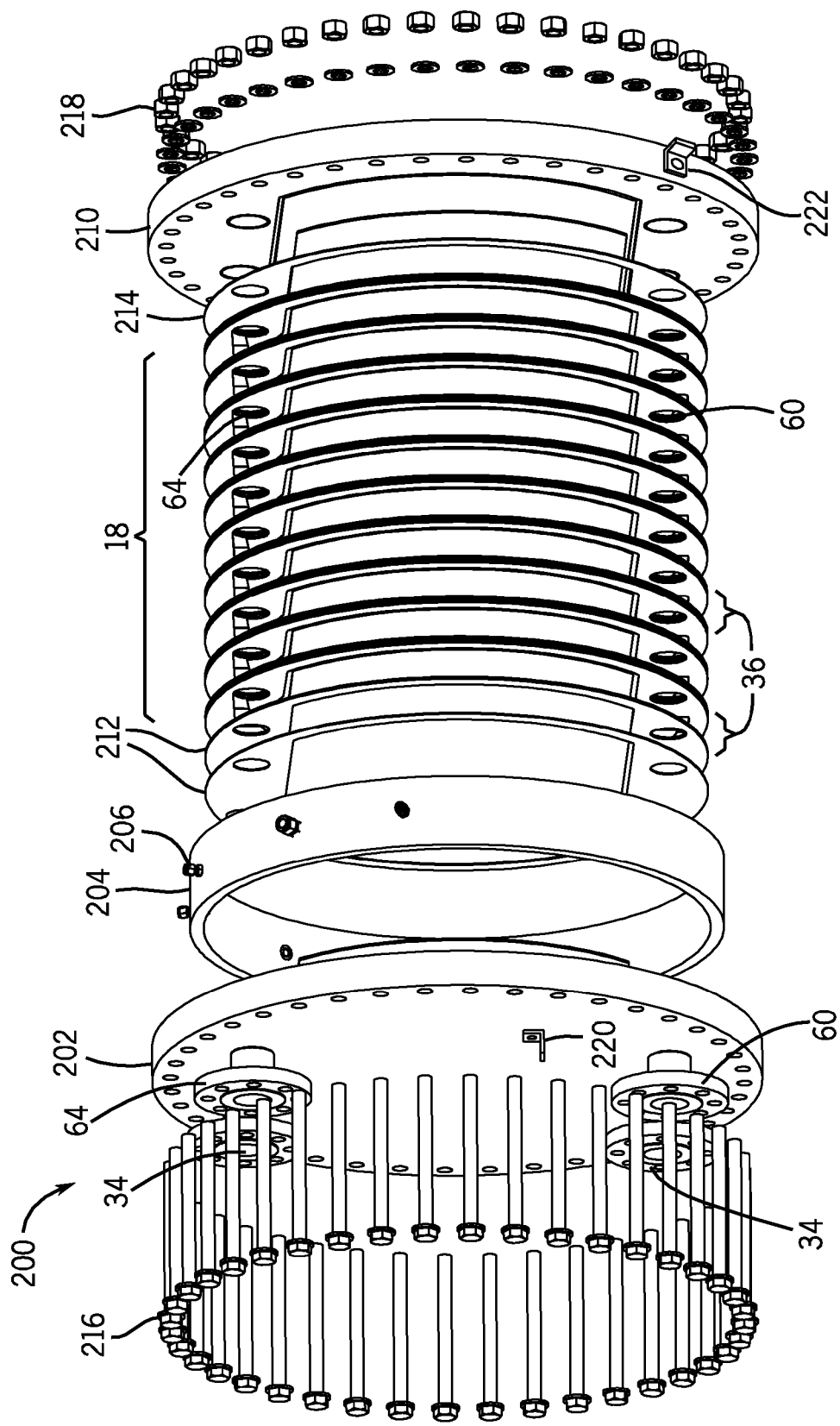
FIG. 3 is an exploded view of the electrolyzer of FIG. 2, showing the individual parts of the assembly.

FIG. 3 illustrates an exploded view 200 showing the individual components of the electrolyzer. As shown in this view, the electrolyzer has an end cap 202, which has connections to the inlet channels 34 and outlet channels 60, 64. The body 204 of the electrolyzer has a number of connectors 206 mounted along the periphery to allow pressure to be applied during operation. The pressure applied is outside of the electrolyzer stack 18 (within the body 204) to reduce hoop stress on the electrolyzer stack 18 by generally equalizing or reducing the pressure differential between the interior and exterior regions of the stack. The electrolyzer stack 18 is formed by joining the electrolyzer cells 36 together to form a single unit, with the apertures in each of the electrolyzer cells 36 aligned to form the inlet channels 34 and outlet channels 60, 64. The individual electrolyzer cells 36 may be joined by adhesives, welding, ultrasonic welding, or any number of other techniques used to join plastic parts. In some embodiments, the cells may simply be compressively mated. Materials that may be used to form the electrolyzer cells 36 are discussed with respect to FIG. 4, below. Other connections 206 on the body 204 may be used to mount instrumentation, such as thermocouples, pressure detectors, and the like.

A base plate 210 is mounted against the body 204 opposite the end cap 202. The end cap 202, base plate 210, and body 204 may be constructed from any suitable materials, such as stainless steel, hastalloy, nickel, and so forth. Further, the parts do not have to be made from metal, as a high performance plastic may provide sufficient properties. Suitable high performance plastics may include, for example, polyphenylene sulfide (PPS) or poly(ether-ether-ketone) (PEEK), among others. Moreover the parts may be made of the same material or may be of different materials. For example, the end cap 202 and the base plate 210 may be made from stainless steel, while the body 204 may be made from a high-performance plastic, thereby insulating the end cap 202 from the base plate 210. The end cap 202 may also be insulated from the base plate 210 by the use of gaskets (not shown) between end cap 202, the body 204, and the base plate 210.

One or more spacer plates 212 may be inserted to insulate the electrolyzer stack 18 from the end cap 202. Further, a gasket 214 may be inserted to add additional compressive force to the stack, or to insulate the stack from the base plate 210. The entire assembly may be held together by bolts 216 inserted through the end cap 202 and base plate 210, which are joined to nuts 218 after insertion through the base plate 210. A power terminal 220 may be welded onto the end cap 202 which may then function as one of the current collectors 40, 44 (FIG. 1). Another power terminal 222 welded onto the base plate 210 may allow the base plate 210 to function as the oppositely charged current collector.

Figure 4:
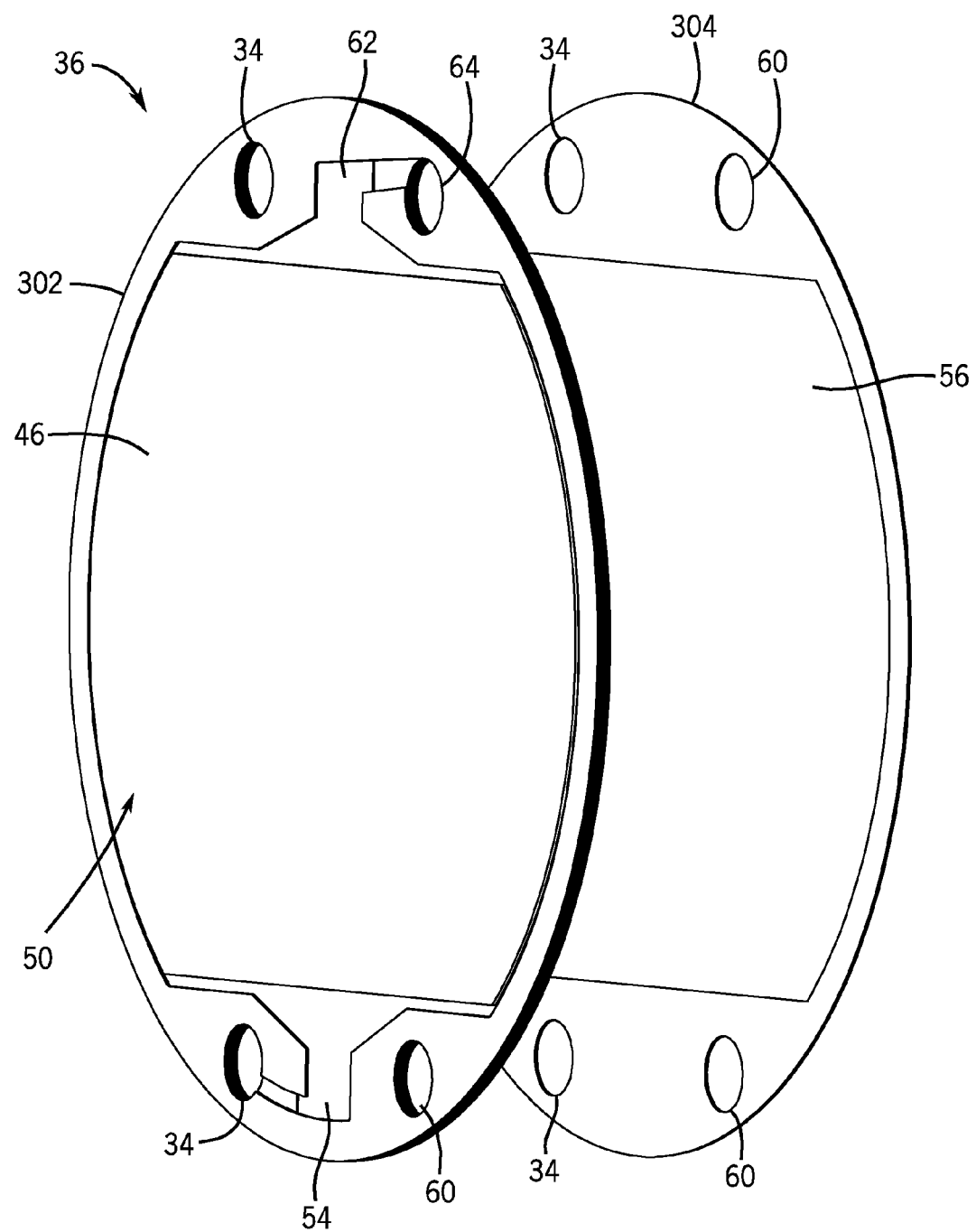
FIG. 4 is a perspective view of an exemplary electrolyzer cell that may be used in the electrolyzer of FIG. 3, showing the location of enhanced electrode.

An individual electrolyzer cell 36 that may be used in the electrolyzer stack 18 of FIG. 3 is shown in the perspective view of FIG. 4. The electrolyzer cell 36 generally includes two parts, an electrode assembly 302, and a diaphragm assembly 304. Both parts 302, 304 have apertures which align with one another, and with other electrolyzer cells 36 to form the inlet channels 34 and the outlet channels 60, 64. The electrode assembly 302 holds the metal plate 46 that forms the bipolar electrode. One side of the electrode assembly 302 has the channel 54 molded in to direct flow of the electrolyte from one of the inlet channels 34 across one surface that will function as the cathode 50, of the metal plate 46. During operation, the flow with the entrained hydrogen bubbles is then directed to the hydrogen outlet channel 64 via hydrogen channel 62, which may also be molded into the electrode assembly 302. An analogous set of channels, as discussed with respect to FIG. 5, directs the flow of oxygen.

The electrode assembly 302 and the diaphragm assembly 304 may be made from any number of materials, and in a presently contemplated embodiment, include a peripheral frame made of a non-conductive, chemically resistant plastic. For example, the frames of the assemblies 302, 304, may be made from polyether ether ketone (PEEK), polyphenylene sulfide (PPS), polyamides, polyimides, polytetrafluoroethylenes, and the like. Other polymers that may be used include high performance blends, such as Noryl, which is a blend of polyphenylene ether and polystyrene (PS) (available from SABIC Innovative Plastics of Pittsfield, Mass.).

The diaphragm assembly 304 may be joined to the electrode assembly 302 to form the single electrolyzer cell 36. The two parts 302, 304 may be joined by any of the techniques used to form the full electrolyzer stack 18, as discussed with respect to FIG. 3, including adhesives, ultrasonic welding, thermal welding, compression, and so forth. The diaphragm assembly 304 holds the liquid permeable membrane 56, which prevent mixing of oxygen formed at the anode 48 of the metal plate 56 with hydrogen formed at the cathode 50 of an adjoining metal plate.

Figure 5:
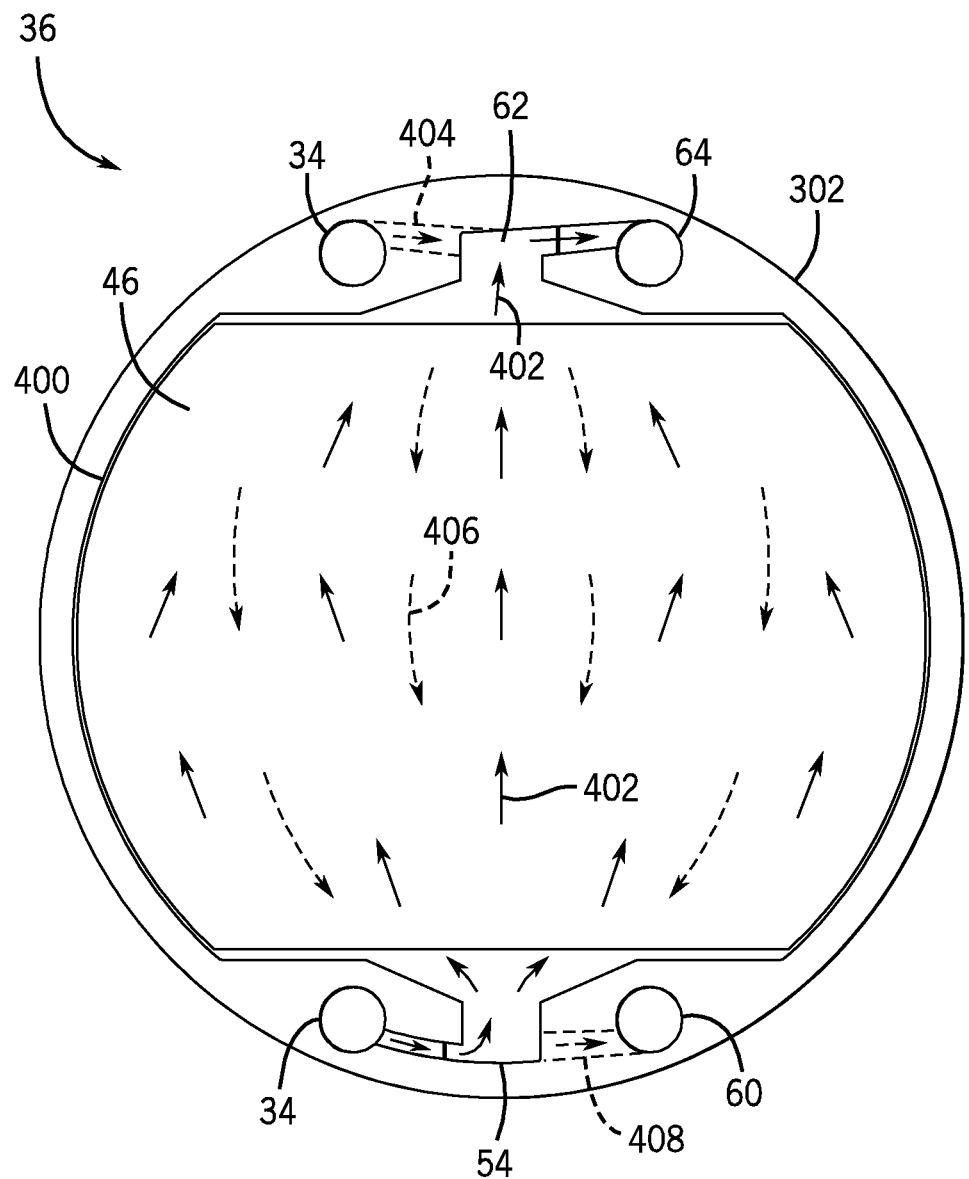
FIG. 5 is a top view of the electrode from FIG. 4, showing the flow of reactants and products across the surface of the enhanced electrode.

The flow patterns in an electrolyzer cell 36 may be more clearly seen in the front view of the electrode assembly 302 shown in FIG. 5. As seen in this figure, the metal plate 46 is held in the electrode assembly 302 by an inset seat 400. The electrolyte solution 22 is delivered to the electrode assembly 302 by the inlet channels 34. A molded channel 54 connects one of the inlet channels 34 to the cathodic surface of the metal plate 46. The resulting flow 402 provides electrolyte solution 22 to the metal plate 46, and carries the electrolyte solution 22 and entrained hydrogen 16 into the hydrogen channel 62, which may be also molded into the electrode assembly 302. The channel 58 delivers the hydrogen stream into the hydrogen outlet channel 64.

The analogous flow pattern for the anodic surface occurs on the opposite side of the metal plate 46, and is illustrated by broken lines. A molded channel 404 in the electrode assembly 302 carries the electrolyte from one of the inlet channels 34 to the anodic side of the metal plate 46. The flow 406 provides electrolyte to the anodic surface and carries the oxygen formed to another molded channel 408, where the oxygen stream leaves the device through the oxygen outlet channel 60.

Figure 6:
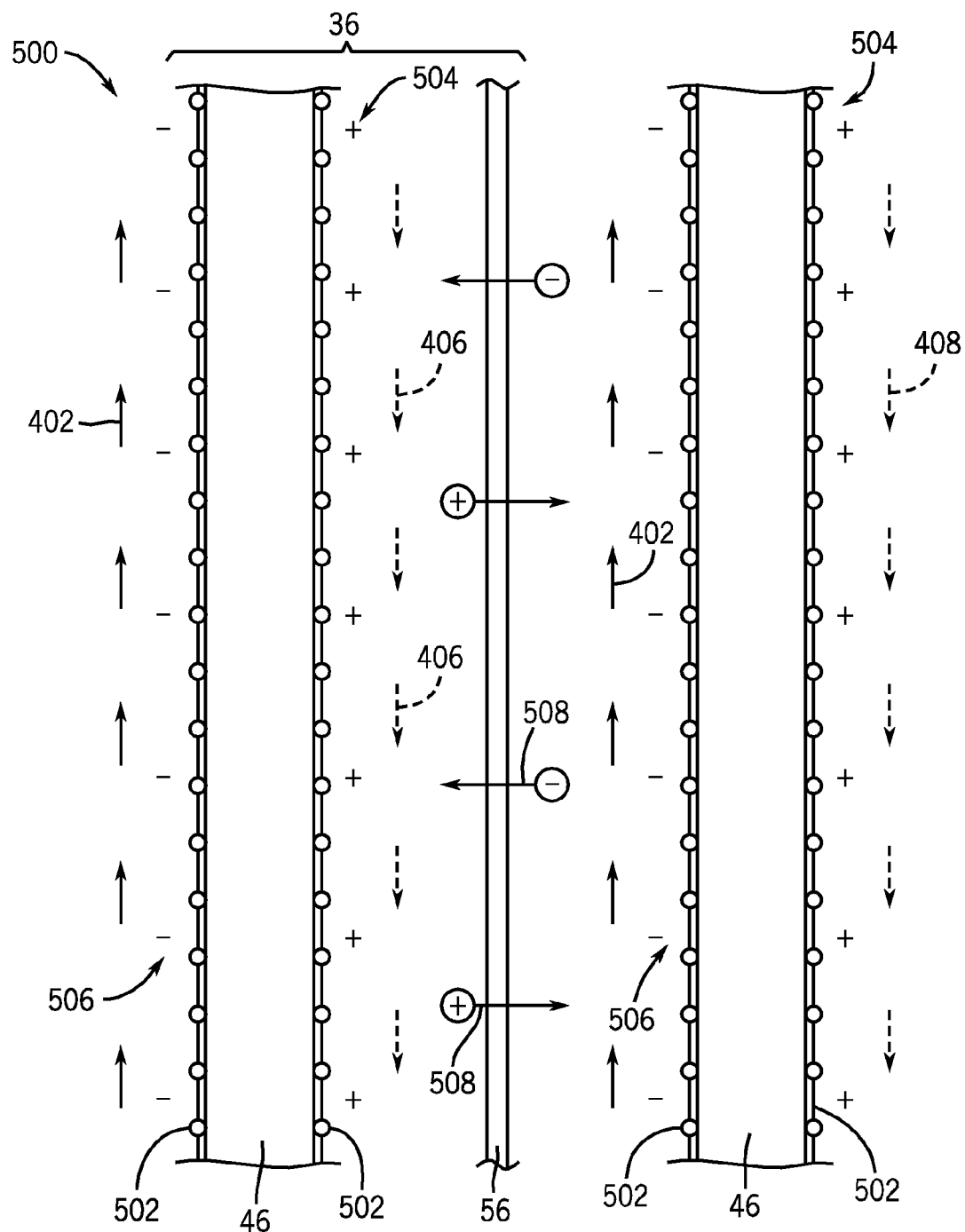
FIG. 6 is a diagrammatical magnified cross section of an electrolyzer cell and an adjacent electrode processed in accordance with the invention.

The operation of metal plate 46 as a bipolar electrode is illustrated by the cross section shown in FIG. 6. This figure shows a magnified view 500 of a cross section of an electrolyzer cell 36 and an adjacent metal plate 46 in an electrolyzer stack 18. Optionally, a wire mesh 502 may be joined to either or both the anodic surface 504 and cathodic surface 506 of the electrode to increase the surface area. In other embodiments, the surface area of the electrode may be increased by stamping a pattern into the metal plate 46. The metal plate 46 and wire mesh 502 may be made from any metal having sufficient stability to withstand degradation during the electrolysis process. Further, the metal may be chosen to resist etching from the chemical environment used for the electrochemical reaction. Examples of suitable metals may include stainless steel, nickel, platinum, palladium, or any other stable metal. In presently contemplated embodiments, the metal plate 46 and wire mesh 502 are formed from stainless steel.

As discussed with respect to FIG. 1, to enhance the efficiency of the metal plate 46 to act as an electrode in an electrochemical device, a porous metal layer may be formed in situ over the metal plate 46 and any wire mesh 502. As discussed in detail below, the porous metal layer may be formed by depositing a mixed metal layer that includes one or more stable metals, such as nickel, platinum, palladium, other stable transition metals, and the like, and one or more metals that may be removed, by etching for example, such as copper, zinc, easily removed transition metals, and the like. The pores or surface irregularities left after the active metal is removed increase the surface area of the electrode and, thus, the efficiency of the device. It should be noted that, as used herein, the term "porous" generally connotes an irregular or open pore structure of increased surface area as compared to a more uniform or less irregular surface. The mixed metal layer may comprise about 8.5 to 9.5 times as much of the stable metal or metals as the easily removed metal or metals. For example, the mixed metal layer may include about 50% to about 90% nickel, with the balance including zinc. In another contemplated embodiment, the metal layer may include nickel, zinc, and other transition metals such as cobalt, copper, manganese, chromium, and the like. In other presently contemplated embodiments, the amount of nickel may be greater than about 50%, with the remainder including zinc.

The porous metal layer may be formed or deposited on the cathodic surface 506, the anodic surface 504, or both. In a presently contemplated embodiment, the porous metal layer is formed at least over the cathodic surface 506. The porous metal layer may be from 2 micrometers up to a thickness determined by the dimensions of the cell compartment, or between about 15 micrometers to about 40 micrometers thick. Further, a layer of a base metal, such as nickel, may be deposited over the metal plate 46 and wire mesh 502 (if present) prior to the deposition of the mixed metal layer. This layer of base metal may improve the adhesion of the porous layer to the metal plate 46, and may extend the lifespan of the device by protecting more active metals, such as the iron in a stainless steel plate, from being removed during the electrochemical reactions. Other metals may be used to form the base metal layer. For example, the metals may include transition metals such as cobalt, manganese, chromium, among others. Under normal operating conditions, the positively-charged metal ions are attracted to the negatively-charged cathodic surface 506. At the cathodic surface 506, the metal ions are reduced, forming the metal layer. Generally, to form a metal layer over the anodic surface 504, the polarity of the device may be reversed during the deposition process.

In an alternate embodiment, the cathodic surface 506 of the metal plate 46 may be electroplated in a separate electroplating anode assembly (not shown), and then incorporated into the electrolyzer stack 18, prior to flushing and leaching out of the easily removed metals. This may be performed to prevent certain metals, such as iron, from migrating from an anodic surface 504 to the cathodic surface 506 during the electroplating process. Generally, in the electroplating anode assembly, the electrode assembly 302 may be temporarily joined to an anode assembly, wherein the anode assembly may be another electrolyzer cell 36 using a different metal for the metal plate 46. After the anode assembly is joined to the electrode assembly 302, the metal plate 46 in the electrode assembly 302 may be plated with a mixed metal layer as described herein. Once the plating is completed, the electrode assembly 302 is removed from the anode assembly and may be assembled into the electrolyzer stack 18. Once the electrode assembly 302 is incorporated into the electrolyzer stack 18, the easily removed metal may be leached out to form the porous surface.

As illustrated in FIG. 6, the cathodic flow 402 and anodic flow 406 may be in opposite directions. As discussed with respect to FIG. 1, during either electrolysis or the formation of a metal layer, the liquid permeable membrane 56 allows ions to flow 508 between the electrode surfaces 504 and 506, conducting current through the electrolysis cell 36. Further, the liquid permeable membrane 56 prevents the mixing of gases.

Figure 7:
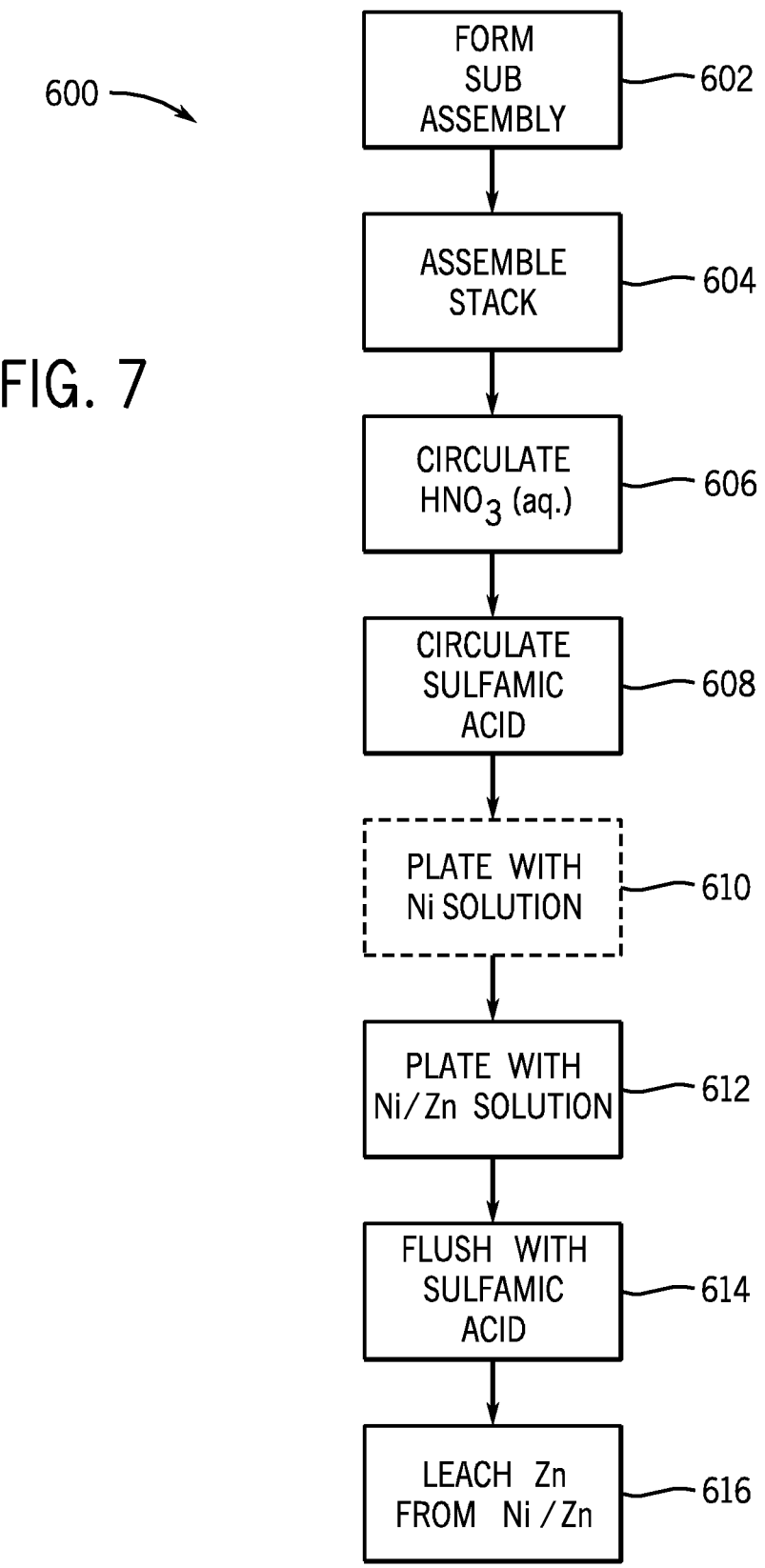
FIG. 7 is a flow chart illustrating an exemplary method for making an enhanced electrode.

A process 600 that may be used to form a device having an enhanced electrode, in accordance with a presently contemplated embodiment, is provided in the flow chart of FIG. 7. The process 600 begins with the formation of a subassembly (block 602), such as the electrolyzer cell 36. The parts of the subassembly may be formed by any techniques used to form and join the parts, as discussed above. For example, the electrode assembly 302 and diaphragm assembly 304 may be injection molded and then assembled, or machined from a single piece, or formed by any other suitable technique known in the art. After the frame of the electrode assembly 302 is formed, the metal plate 46 may be joined to it, for example, by placing the metal plate 46 in an inset seat 400 (FIG. 5) molded into the electrode assembly frame. In some embodiments, the metal plate 46 may be welded, adhered, or otherwise fixed in the electrode assembly 302 to form a single unit. Similarly, a liquid permeable membrane 56 may be affixed to the face of the frame of the diaphragm assembly 304, and held in place by welding, adhesive, or any other suitable technique. After assembly of the electrode assembly 302 and the diaphragm assembly 304 is completed, the parts may be joined to form an electrolyzer cell 36. As noted above, the two parts may be joined by welding, adhesives, or any other suitable techniques.

After the electrolyzer cells 36 are made, they may be assembled to form the electrolyzer stack 18 (block 604). The apertures in the electrolyzer cells 36 are aligned to form the inlet channels 34 and outlet channels 60, 64. Alignment of the electrolyzer cells 36 may be performed by threading a rod, tube, or other object through the inlet channels 34 and/or outlet channels 60, 64 of the electrolyzer cells 36, or through the mating of alignment features, such as protrusions and recesses in adjacent cells (not shown). After alignment, the electrolyzer cells 36 may be permanently joined by adhesives, welding, or other techniques, or may be compressively joined without permanent joints being formed. Further, any additional parts used to form the electrolyzer, for example, spacer plates 212 or gasket 214, may be joined to the electrolyzer stack 18 using the same techniques. After formation of the electrolyzer stack 18 is completed, it may be mounted in the body 204 to form the electrolyzer 100. In other embodiments, the formation of the enhanced electrode may be performed on the electrolyzer stack 18 prior to the final assembly of the electrolyzer 100.

After assembly of the electrolyzer 100, a surface preparation solution may be circulated through the electrolyzer 100 to prepare the electrode surfaces, as indicated in block 606. The etching solution may, for example, improve the adhesion of subsequently deposited layers to the surface of the electrode. For example, the etching solution may be a 10% v/v solution of nitric acid (such as 100 ml/l of nitric acid in water), which may be flowed through the device for about 30 minutes. In other embodiments, the etching solution may contain sulfuric acid, phosphoric acid, or other acids. The etching time may be adjusted depending upon such factors as the material of the electrode, the preparation solution utilized, and the degree and nature of the surface preparation desired. For example, the etching may be performed for 10 minutes, 20 minutes, 45 minutes, 60 minutes, or 120 minutes.

Once the preparation of the electrode surfaces is completed, a conditioning solution may be flowed through the electrolyzer 100 (block 608) to condition the liquid permeable membrane 56 (FIG. 4), for example, to saturate the membrane and enhance the flow of ions across the membrane. In a presently contemplated embodiment, the conditioning solution may be a weak acid, for example, a 5 wt. % solution of sulfamic acid. The preparation solution may be circulated through the electrolyzer for a time sufficient to provide the desired membrane conditioning, from about 1 to 24 hours in a presently contemplated embodiment, and then drained from the electrolyzer.

After the membrane is conditioned, one or more metal layers, such as a nickel or a nickel/zinc layer, may be formed over the metal plate 46. For example, a nickel layer may optionally be formed over the electrode (block 610), prior to the deposition of the nickel/zinc layer as shown in block 612. The formation of a base metal layer, such as nickel, may serve to protect the electrode surface or to enhance the adhesion of a nickel/zinc layer, among other functions. The formation of either layer may generally follow the same procedure, with elimination of the zinc from the solution allowing the formation of the nickel layer.

To form a nickel/zinc layer, a solution containing metal ions may be prepared using the concentrations and reagents shown in Table 1. By way of example only, as shown in Table 1, a commercial nickel solution (Barrett SNR-24 available from MacDermid Corp. of Denver, Colo.) may be used. Other embodiments may use solutions directly prepared from nickel reagents, for example, $NiCL_2$ or $Ni(NO_3)_2$. To improve wetting of the electrode by the solution, the solution may include a surfactant, such as Barrett SNAP-L, also available from MacDermid.

TABLE 1

Solution containing metal ions.

| Nickel-Zinc Solution Description | Concentrations |
| --- | --- |
| Barrett SNR-24 Nickel Concentrate (182 g $Ni^{+2}$/L) | 115 g $Ni^{+2}$/L |
| ZnCl2, anhydrous (47.97% Zn) | 23 g $Zn^{+2}$/L |
| Barrett SNAP-L (wetting agent) | 0.2 mL/L |
| Boric Acid | 10 g/L |

The solution may be heated to assist in dissolution of the materials and to enhance the adhesion of the layer to the electrode. For example, the solution may be heated to 30° C. to 60° C., or to about 80° C. After the solution reaches the target temperature, it may be circulated through the electrolyzer 100 for about an hour to heat the internal surfaces of the device. As will be appreciated by those skilled in the art, the particular processing of the solutions will vary, and in general will follow the processing parameter indications of the plating chemistry supplier.

Once the internal surfaces have reached temperature, an electric field may be applied across the stack to form the layer. The current density of the electric field may generally be between about 54 amps/sq. meter and about 2200 amps/sq. meter of electrode surface, or between about 320 and about 540 amps/sq. meter. For example, for an electrode having a surface area of about 0.675 sq. meter, the applied current may be about 290 amps. Generally, the voltage is maintained at less than 50 volts. The applied electrical field may be stepped up to full amperage to form a more even surface, for example, set to about 10% of the final amperage for about 2 minutes, and then ramped to the final amperage over abut 1 minute, before being left at the full amperage for about 15 minutes. The solution is flowed through the device at a sufficient rate to maintain a concentration of the metal ions in proximity to the surface. For example, the solution may be flowed through a device having 10 electrolyzer cells 36 at a rate of about 50 gal./min. In larger devices, e.g., having 100 electrolyzer cells 36, proportionally higher rates may be used to achieve full coverage of the electrode surfaces.

After formation of the metal layers, the conditioning solution may be flowed through the device (block 614) to remove any excess metal ions. This may prevent the formation of precipitants on the electrodes as metal ions contact the alkaline solution that may be used for etching or as the electrolyte.

After formation of the nickel/zinc layer, a solution may be circulated through the device to remove zinc from the surface, as indicated in block 616. In a presently contemplated embodiment, an etching solution is employed that may generally be the same as the electrolyte solution 22 discussed with respect to FIG. 1. For example, in an embodiment, the etching solution may be a 30 wt % KOH solution. This solution will remove zinc ions from the nickel/zinc layer in the following chemical reaction:

$$Zn+2OH^- \rightarrow ZnO_2^{2-} \text{ (zincate)} + H_2 \text{ (gas)}.$$

The etching solution may be circulated for a time sufficient to provide the degree of porosity or surface area desired, such as for about 24 hours in a presently contemplated embodiment. However, any zinc that has not been leached by the etching solution will generally be removed by the electrolyte solution 22 (FIG. 1), which may have the same chemical composition as the etching solution. After removal of the zinc, a porous layer of nickel remains over the electrode surface, providing an enhanced electrode surface.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for in situ processing of electrodes, comprising:
    assembling a plurality of cells, wherein each cell comprises a metal plate and a diaphragm;
    joining the plurality of cells together to form a device comprising a stack of cells, wherein the metal plate of each cell is separated from the metal plate of an adjoining cell by the diaphragm of the respective cell;
    plating the metal plate of each cell in situ by flowing a plating solution through each cell and applying an electrical field across the stack to form a metal layer over the metal plate of each cell; and
    increasing the surface area of the metal layer in situ.

2. The method of claim 1, wherein the surface area of the metal layer is increased by flowing an etching solution through each cell.

3. The method of claim 2, wherein the etching solution comprises a metal hydroxide solution.

4. The method of claim 1, wherein the metal layer comprises at least two metals, and wherein the surface area of the metal layer is increased by at least partially removing a metal from the metal layer to increase porosity of the metal layer.

5. The method of claim 1, wherein the device comprises an electrolyzer.

6. The method of claim 1, wherein the metal layer comprises nickel and zinc.

7. The method of claim 1, wherein the metal layer comprises nickel, zinc, and at least one other transition metal.

8. The method of claim 6, wherein the metal layer comprises between about 50% to about 95% nickel by weight and the balance comprises zinc.

9. The method of claim 7, wherein the metal layer comprises greater than about 50% nickel by weight, and the remainder comprises zinc and at least one other transition metal.

10. The method of claim 1, wherein each metal plate has two opposing surfaces configured function as an anodic surface and a cathodic surface, and wherein the metal layer is formed over the cathodic surface.

11. The method of claim 1, comprising forming a base layer over the surface prior to plating the metal layer on the metal plate.

12. The method of claim 11, where the base layer is nickel.

13. The method of claim 1, wherein the device is kept between about 30° C. and about 80° C. while the electric field is applied.

14. The method of claim 1, wherein the electric field applied to the stack has a current density of between about 54 amps per square meter of electrode surface and about 2200 amps per square meter of electrode surface.

15. The method of claim 1, wherein the solution comprising metal ions is flowed through the device at a flow rate of between about 8 liters/minute and about 70 liters/minute.

16. The method of claim 1, comprising preparing the metal plate by flowing an etching solution through the device prior to plating.

17. The method of claim 16, comprising conditioning the diaphragm of each cell by flowing a conditioning solution through the device after flowing the etching solution through the device.

18. The method of claim 1, comprising flushing the device to remove excess plating solution prior to increasing the surface area of the metal layer.

19. A method for making an electrolyzer comprising:
assembling a plurality of electrode assemblies comprising metal plates interposed with a plurality of diaphragm assemblies in an electrolyzer body, the electrode assemblies and the diaphragm assemblies including flow paths for the flow of fluid over the electrode assemblies and diaphragm assemblies;
plating the metal plates in situ with a metal layer that includes at least two metals by flowing a plating solution through the flow paths; and
at least partially removing one of the metals in situ from the metal layer to increase the surface area of the metal layer.

20. The method of claim 19, wherein the metal is removed from the metal layer by flowing an etching solution through the flow paths.

21. The method of claim 20, wherein the etching solution comprises a metal hydroxide solution.

22. The method of claim 19, wherein the metal layer comprises nickel and zinc.

23. The method of claim 19, wherein the metal plates have two opposing surfaces configured function as an anodic surface and a cathodic surface, and wherein the metal layer is formed over the cathodic surface of each metal plate.

24. The method of claim 23, comprising:
individually plating the cathodic surface of each the metal plates in the electrode assemblies in an electroplating anode assembly, wherein the electroplating anode assembly comprises the electrode assembly and an anode assembly, and wherein an electrode material in the anode assembly is different from that of the electrode assemblies;
assembling the plurality of electrode assemblies comprising the metal plates interposed with the plurality of diaphragm assemblies in the electrolyzer body; and
at least partially removing one of the metals in situ from the metal layer to increase the surface area of the metal layer.

* * * * *